May 3, 1932.  J. J. SALE  1,856,821
RETAINING VALVE
Filed Jan. 21, 1930
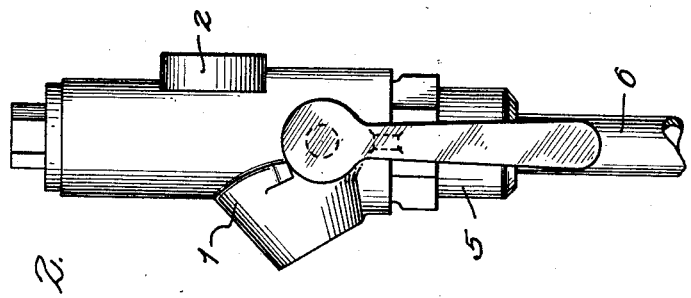
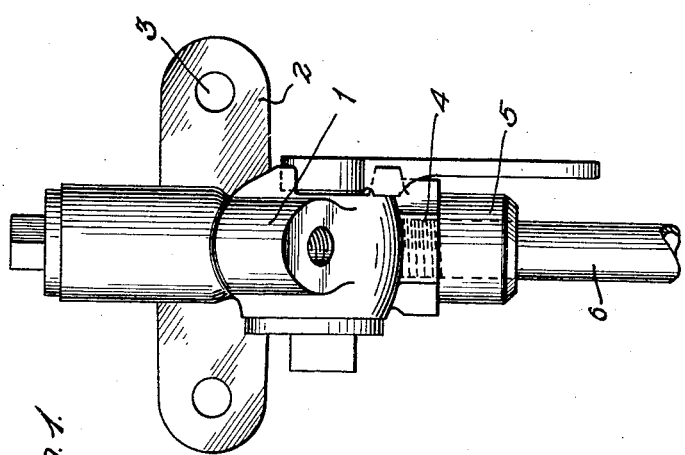
Joseph J. Sale, Inventor Patented May 3, 1932

1,856,821

UNITED STATES PATENT OFFICE

JOSEPH J. SALE, OF FAYETTEVILLE, WEST VIRGINIA

RETAINER VALVE

Application filed January 21, 1930. Serial No. 422,412.

Retaining valves are applied to railroad cars to make the movement of a train safe, and to conserve the supply of air, and this valve when set and in good working order prevents all of the air escaping from the brake cylinder, but retains a certain amount of pressure therein sufficient to hold the brake in a set position, while the air is being replenished in the train line. When the air pressure in the line is increased or replenished, if the retaining valve is in an inoperative condition, the triple valve will automatically assume a released position and allow the train to gain momentum and run out of control when traveling downgrade. It is, therefore, of the utmost importance that the retaining valve be in good working order at all times.

It frequently happens as a result of service conditions that the pipe leading from the air brake system of the car to the retaining valve breaks loose from the retaining valve at the threads where it enters the retaining valve, and it has been found that this is the weakest point in the system. This breakage is the result of many service conditions and when it happens it is necessary to rethread the pipe which results in some cases in lowering the position of the retainer valve, or in replacing the retainer pipe, which latter is a material repair when it is considered that in box cars the pipe is about twenty feet long from the union to the retainer valve and in open type cars about fifteen feet long.

The object of my invention is to provide a support for the retainer pipe between its threaded connection with the retainer valve and the union from which the pipe leads; and with this and other objects in view my invention consists of the parts and combination of parts as will be herinafter pointed out.

In the drawings:

Figure 1 is a front elevation of a retainer valve embodying my invention.

Figure 2 is a side elevation of the same.

The reference numeral 1 designates a retaining valve having the usual anchoring lugs 2 provided with bolt openings 3 through which suitable bolts pass to secure the valve to the car, or an anchor secured to the car according to the practice now prevailing on railroads.

The retainer pipe 6 is threaded at its upper end as at 4 whereby it is secured by screwing it into the valve as is usual. Now to reduce vibration to a minimum, and thus eliminate the possibility of the pipe breaking off at its joint with the valve (the threads weakening the pipe at this point materially) I cast integrally with the valve 1 a sleeve 5 depending from the body of the valve and in axial alignment with the threaded pipe opening in the valve and in attaching pass the pipe 3 through this sleeve 5 in screwing it into the valve 1, thus affording a support for the pipe 2 comparatively close to its joint with the retaining valve, thus reducing vibration of the pipe, relative to its connection with the retaining valve to a minimum, which results in eliminating breakage of the pipe 2 at its weakest point, viz., at its threaded connection with the valve.

By casting the sleeve 5 integral with the valve I eliminate separate parts with resultant loss, besides which I am enabled to reduce the number of parts to be carried by the railroad store houses and repair shops, which alone is of considerable moment to railroads from the standpoint of economy.

What I claim is:

A retainer valve having depending integral threadless sleeve in spaced relation to and in axial alignment with the threaded pipe opening of the valve.

In testimony whereof I affix my signature.

JOSEPH J. SALE.